United States Patent
Reeves et al.

(10) Patent No.: US 10,663,057 B2
(45) Date of Patent: May 26, 2020

(54) LUBRICANT FLUID STORAGE AND ROUTING FEATURES FOR ACTIVE TRANSFER CASE WITH PASSIVE LUBRICANT FLUID SYSTEM

(71) Applicant: BorgWarner Inc., Auburn Hills, MI (US)

(72) Inventors: Branden Levi Reeves, Oxford, MI (US); Ian Daniel Worcester, Royal Oak, MI (US); Robert Martin Quinn, Washington, MI (US)

(73) Assignee: BorgWarner Inc., Auburn Hills, MI (US)

( * ) Notice: Subject to any disclaimer, the term of this patent is extended or adjusted under 35 U.S.C. 154(b) by 253 days.

(21) Appl. No.: 15/795,324

(22) Filed: Oct. 27, 2017

(65) Prior Publication Data

US 2018/0119796 A1    May 3, 2018

Related U.S. Application Data

(60) Provisional application No. 62/416,380, filed on Nov. 2, 2016.

(51) Int. Cl.
*F16H 57/04* (2010.01)
*B60K 23/08* (2006.01)
(Continued)

(52) U.S. Cl.
CPC ....... *F16H 57/0473* (2013.01); *B60K 17/344* (2013.01); *B60K 23/08* (2013.01);
(Continued)

(58) Field of Classification Search
CPC .... F16H 57/04; F16H 57/042; F16H 57/0423; F16H 57/0427; F16H 57/043; F16H 57/0431; F16H 57/045; F16H 57/0457; F16H 57/0473; F16H 57/0489; F16H 57/05; B60K 17/344; B60K 23/08;
(Continued)

(56) References Cited

U.S. PATENT DOCUMENTS 5,699,870 A    12/1997    Warren
6,779,642 B2 *  8/2004    Arai ................. F16D 25/12
                                                192/113.34

(Continued)

*Primary Examiner* — Jacob S. Scott
*Assistant Examiner* — Lori Wu
(74) *Attorney, Agent, or Firm* — Miller, Matthias & Hull LLP

(57) ABSTRACT

An active transfer case for a motor vehicle may comprise a clutch assembly configured to rotatably couple a primary output shaft to an input sprocket when engaged. The clutch assembly may include a clutch pack having a plurality of clutch plates, and a clutch hub having a clutch hub center defined between an inner ring and an outer ring. The outer ring of the clutch hub may have a hub aperture placing the clutch hub center in fluid communication with the clutch plates. The active transfer case may further comprise a retainer slidingly inserted in the clutch hub center between the inner ring and the outer ring. The retainer may include a retainer aperture that aligns with the hub aperture of the clutch hub when the clutch assembly is engaged to permit a flow of a lubricant fluid from the clutch hub center to the clutch plates.

15 Claims, 10 Drawing Sheets

(51) Int. Cl.
    *B60K 17/344*    (2006.01)
    *F16D 13/52*     (2006.01)
    *F16D 13/74*     (2006.01)
    *F16H 7/02*      (2006.01)
    *B60K 5/02*      (2006.01)

(52) U.S. Cl.
    CPC ............. *F16D 13/52* (2013.01); *F16D 13/74* (2013.01); *F16H 7/02* (2013.01); *F16H 57/043* (2013.01); *F16H 57/045* (2013.01); *B60K 5/02* (2013.01); *B60K 2023/0825* (2013.01); *B60Y 2306/03* (2013.01); *B60Y 2400/424* (2013.01)

(58) Field of Classification Search
    CPC ... B60K 2023/825; F16D 13/52; F16D 13/72; F16D 13/74
    See application file for complete search history.

(56)         References Cited

U.S. PATENT DOCUMENTS

| | | | |
|---|---|---|---|
| 2009/0211830 A1* | 8/2009 | Kato | B60K 23/08 180/244 |
| 2015/0240935 A1 | 8/2015 | Kampe et al. | |
| 2016/0040776 A1* | 2/2016 | Cradit | F16H 57/0473 192/113.1 |
| 2017/0356535 A1* | 12/2017 | Peura | F16H 48/22 |
| 2018/0010682 A1* | 1/2018 | Pritchard | B60K 17/02 |

\* cited by examiner

LUBRICANT FLUID STORAGE AND ROUTING FEATURES FOR ACTIVE TRANSFER CASE WITH PASSIVE LUBRICANT FLUID SYSTEM

CROSS-REFERENCE TO RELATED APPLICATIONS

This application claims the benefit of U.S. Patent Application No. 62/416,380 filed on Nov. 2, 2016, the disclosure of which is herein incorporated by reference in its entirety.

TECHNICAL FIELD

The present disclosure generally relates to active transfer cases and, more specifically, to storage and routing features for lubricant fluid in active transfer cases having passive lubricant fluid systems.

BACKGROUND

A transfer case for a motor vehicle transfers power from the transmission the front axles and/or the rear axles, while permitting selective shifting between two-wheel drive ("2WD") and all-wheel drive ("AWD"). A transfer case may include an input shaft that delivers output power from the transmission to the transfer case. The input shaft may be coupled to a primary output shaft that connects to the rear (or front) drive shaft leading to the rear (or front) wheels for both 2WD and AWD mode. In addition, the primary output shaft may have an input sprocket mounted thereon that drives the rotation of a chain interconnecting the input sprocket to an output sprocket. The output sprocket may drive the rotation of a secondary output shaft that connects to the front (or rear) drive shaft leading to the front (or rear) wheels in AWD mode. To shift between 2WD mode and AWD mode, the transfer case may also include a clutch assembly that, when actuated, selectively transfers rotational motion from the primary output shaft to the input sprocket so that the rotational motion is delivered to the secondary output shaft via the interconnecting chain and output sprocket. The clutch assembly may include a clutch pack having interleaved clutch plates that are compressed when actuated to transmit torque and rotational energy from the primary output shaft to the input sprocket. In an active transfer case, power may be transmitted to the front and/or rear drive shaft on demand without input from the driver.

Transfer cases may also include a lubricant fluid system that circulates a lubricant fluid through targeted components of the clutch assembly, including the clutch plates for cooling the clutch pack. The lubricant fluid system may be active and include a positive displacement device (e.g., a pump, etc.) that forces the flow of the lubricant fluid through the components of the clutch assembly. In other transfer case designs, the lubricant fluid system may be passive and may rely on splash of the lubricant fluid off of rotating internal parts to deliver the lubricant fluid to the targeted components.

In transfer cases having passive lubricant fluid systems, the lubricant fluid may sometimes disperse to unintended areas. If an insufficient amount of the lubricant fluid reaches the targeted components of the clutch assembly (e.g., the clutch plates), damage to the clutch assembly may occur. In addition, in transfer cases having passive lubrication systems, there may be a delay between when the clutch assembly is actuated and when the lubricant fluid is delivered to the clutch plates. In some cases, the delay in delivery may be on the order of several seconds. Such a delay may lead to damage to the clutch plates and the clutch assembly as a whole.

U.S. Patent Application Publication Number US 2015/0240935 discloses a transfer case having a lubricant collection receptacle that maximizes lubricant fluid retention when there is not a high torque demand on the clutch system. While effective, there is still a need for improved lubricant delivery designs for transfer cases having passive lubricant fluid systems.

SUMMARY

In accordance with one aspect of the present disclosure, an active transfer case for a motor vehicle is disclosed. The active transfer case may comprise a primary output shaft, a secondary output shaft, an input sprocket, an output sprocket, and a chain rotatably coupling the input sprocket to the output sprocket. The secondary output shaft may be rotatably coupled to the output sprocket. The active transfer case may further comprise a clutch assembly configured to rotatably couple the primary output shaft to the input sprocket when engaged. The clutch assembly may include a clutch pack having a plurality of clutch plates, and a clutch hub having a clutch hub center defined between an inner ring and an outer ring. The outer ring of the clutch hub may have at least one hub aperture placing the clutch hub center in fluid communication with the clutch plates. In addition, the active transfer case may further comprise a passive lubricant fluid circuit configured to circulate a lubricant fluid through the clutch hub center and the clutch plates when the clutch assembly is engaged. The active transfer case may further comprise a retainer slidingly inserted in the clutch hub center between the inner ring and the outer ring. The retainer may include at least one retainer aperture that aligns with the hub aperture of the clutch hub when the clutch assembly is engaged to permit a flow of the lubricant fluid from the clutch hub center to the clutch plates.

In accordance with another aspect of the present disclosure, a method for delivering a lubricant fluid to clutch plates of an active transfer case is disclosed. The active transfer case may include a chain rotatably coupling an input sprocket to an output sprocket, a primary output shaft, a secondary output shaft rotatably coupled to the output sprocket, and a clutch assembly configured to rotatably couple the input sprocket to the primary output shaft when engaged. The clutch assembly may include the clutch plates, a clutch hub having a clutch hub center defined between and inner ring and an outer ring, and a retainer inserted in the clutch hub center between the inner ring and the outer ring. The method may comprise engaging the clutch assembly with an apply plate and a pressure plate, sliding the retainer axially in the clutch hub center to a first position in which at least one retainer aperture of the retainer is aligned with at least one hub aperture of the outer ring. The aligned apertures may provide fluid communication between the clutch hub center and the clutch plates. The method may further comprise allowing a reservoir of a lubricant fluid trapped in the clutch hub center to flow through the aligned apertures to the clutch plates, and permitting the lubricant fluid to flow into the clutch hub center through a passive lubricant fluid circuit, wherein a rate of flow of the lubricant fluid into the clutch hub center exceeds a rate of flow of the lubricant fluid out of the clutch hub center through the aligned apertures.

In accordance with another aspect of the present disclosure, an active transfer case for a motor vehicle is disclosed. The active transfer case may comprise a primary output shaft, a secondary output shaft, an input sprocket, an output sprocket, and a chain rotatably coupling the input sprocket to the output sprocket. The secondary output shaft may be rotatably coupled to the output sprocket. The active transfer case may further comprise a clutch assembly configured to rotatably couple the primary output shaft to the input sprocket when engaged. The clutch assembly may include a clutch pack having a plurality of clutch plates, and a clutch hub having a clutch hub center. The active transfer case may further include a passive lubricant fluid circuit configured to circulate a lubricant fluid through the clutch hub center and the clutch plates when the clutch assembly is engaged. In addition, the active transfer case may comprise an apply plate configured to engage the clutch assembly by compressing the clutch plates. The apply plate may have a lubricant guide oriented toward the clutch hub center. The lubricant guide may be configured to direct a flow of the lubricant fluid to the clutch hub center.

These and other aspects and features of the present disclosure will be more readily understood when read in conjunction with the accompanying drawings.

DETAILED DESCRIPTION

Figure 1:
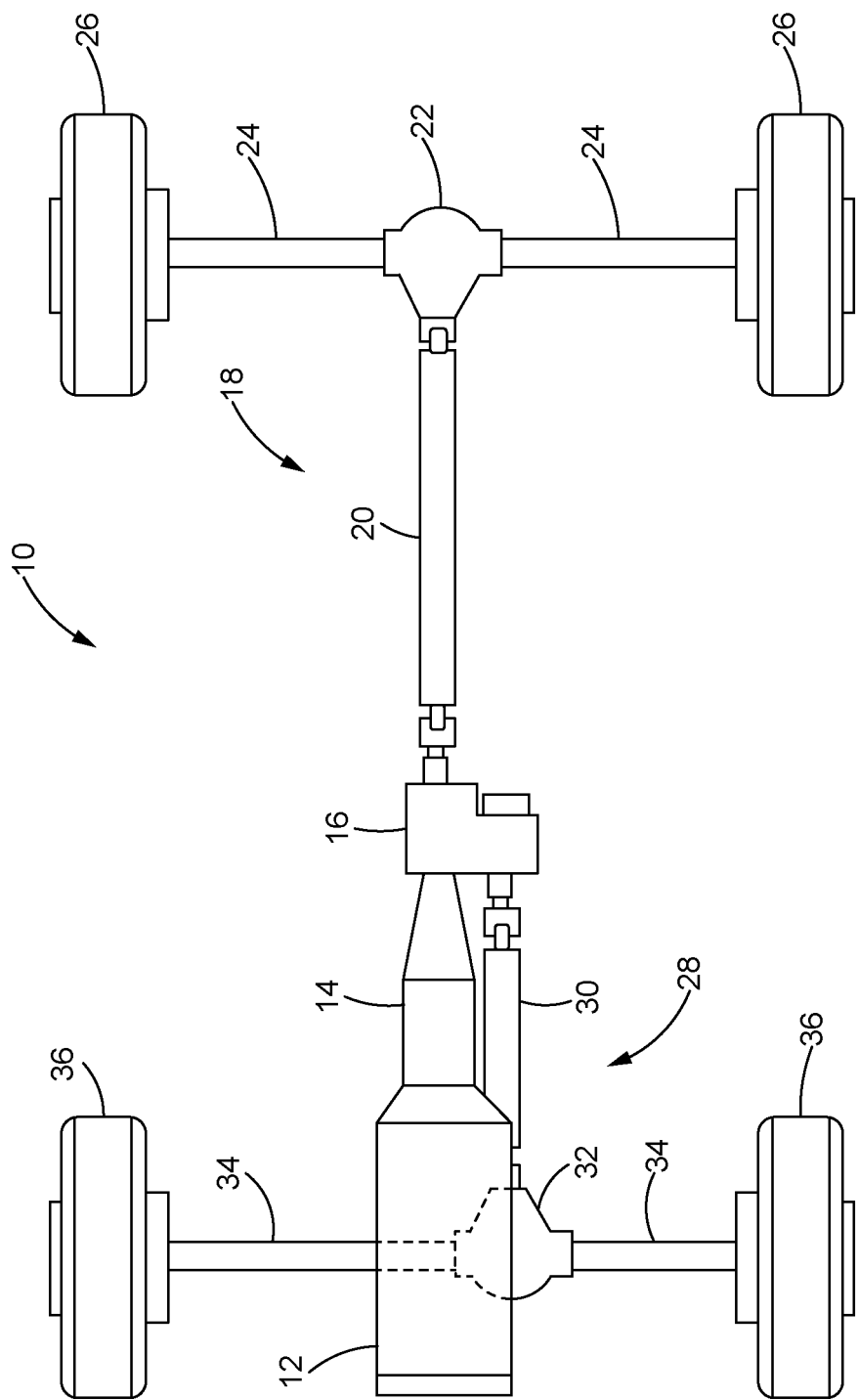
FIG. 1 is a plan view of a motor vehicle driveline including an active transfer case, constructed in accordance with the present disclosure.

Referring now to the drawings, and with specific reference to FIG. 1, a driveline 10 for a motor vehicle is shown. The driveline 10 may include an engine 12 which drives a transmission 14. The transmission 14 may be a manual transmission or an automatic transmission, as will be understood by those with ordinary skill in the art. The output of the transmission 14 may drive a transfer case 16 which, in turn, may operatively couple to and drive a primary (e.g., rear) driveline assembly 18. The primary driveline assembly 18 may include a primary drive shaft 20 (e.g., a rear drive shaft) which operatively couples to and drives a primary differential 22. The primary differential 22 may drive a pair of primary axles 24 which drive primary wheels 26 (e.g., rear wheels) for rotation. In other embodiments, however, the primary driveline assembly 18 may drive the front wheels of the motor vehicle.

The transfer case 16 may also selectively couple to and drive a secondary (e.g., front) driveline assembly 28. The secondary driveline assembly 28 may include a secondary drive shaft 30 (e.g., a front drive shaft) which operatively couples to and drives a secondary differential 32. The secondary differential 32 may drive a pair of secondary axles 34 which, in turn, may drive secondary wheels 36 (e.g., front wheels) for rotation. Alternatively, the secondary driveline assembly 28 may drive the rear wheels of the motor vehicle.

Figure 2:
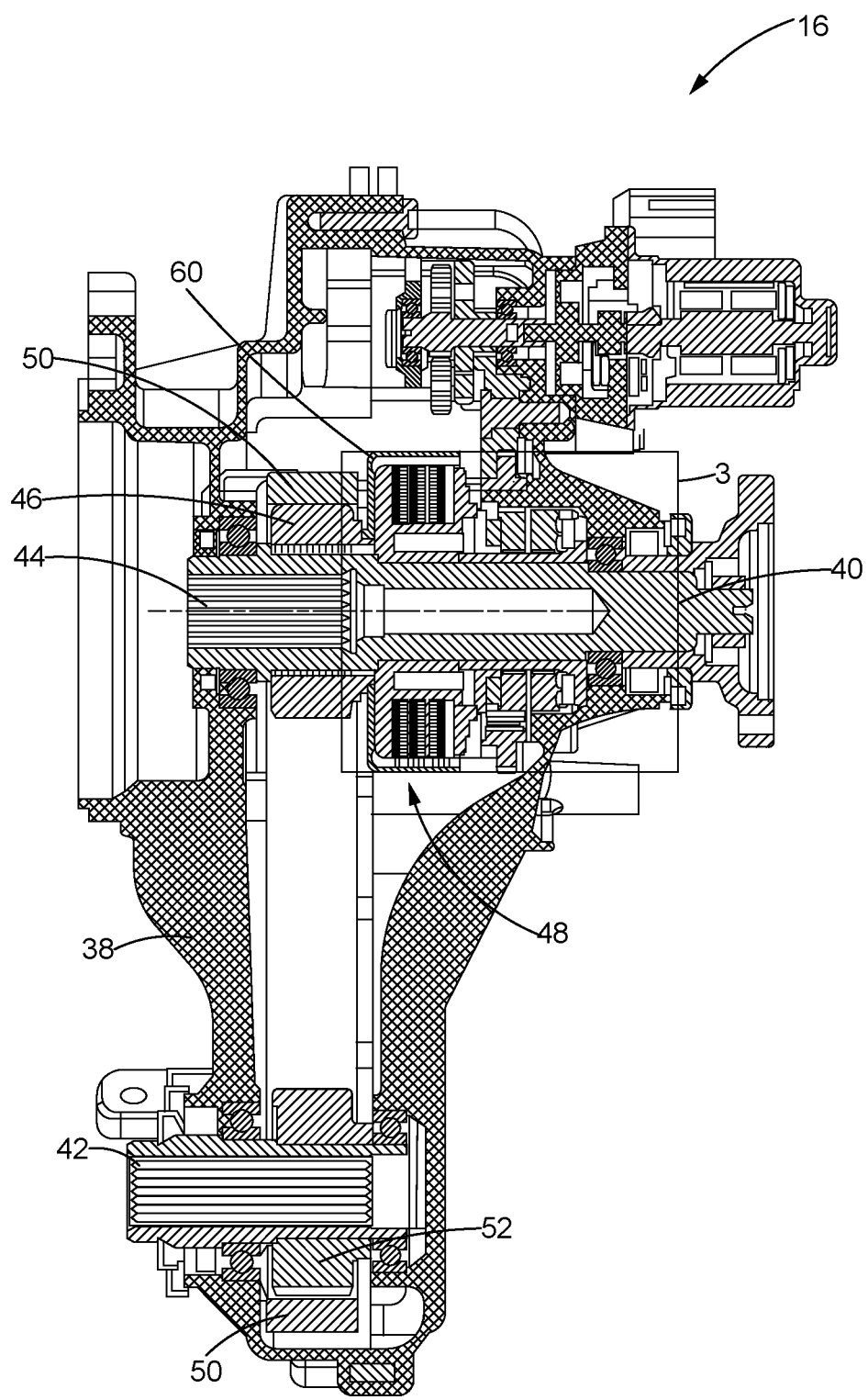
FIG. 2 is a cross-section of the active transfer of FIG. 1, constructed in accordance with the present disclosure.

Turning now to FIG. 2, the transfer case 16 is shown in cross-section. The transfer case 16 may allow shifting between two-wheel drive (2WD) mode, in which power is only delivered to the primary driveline assembly 18, and all-wheel drive (AWD) mode, in which power is delivered to both the primary driveline assembly 18 and the secondary driveline assembly 28. In addition, as will be understood by those with ordinary skill in the art, the transfer case 16 may be an "active" transfer case in which shifting between 2WD mode and AWD mode occurs as needed without input from the driver.

The transfer case 16 may include a housing 38 that houses a primary output shaft 40 (which couples to the primary drive shaft 20) and a secondary output shaft 42 (which couples to the secondary drive shaft 30), with the primary output shaft 40 and the secondary output shaft 42 both extending from the housing 38. An input shaft 44 may deliver output drive power from the transmission 14 to the transfer case 16. In addition, the input shaft 44 may be rotationally coupled to the primary output shaft 40 for both 2WD and AWD. As used herein, the phrase "rotationally coupled" refers to components that are connected and are capable of rotating together at the same or similar speeds. In addition, as used herein, the term "couple" may refer to either a direct connection or an indirect connection between components with one or more intervening elements therebetween.

The primary output shaft 40 may pass through an input sprocket 46, and the input sprocket 46 may be selectively rotationally coupled to the primary output shaft 40 through a clutch assembly 48. A chain 50 (or belt, idler, etc.) may rotationally couple the input sprocket 46 to an output sprocket 52, and the output sprocket 52 may drive the rotation of the secondary output shaft 42. When the clutch assembly 48 is not engaged, the primary output shaft 40 may rotate freely within the input sprocket 46 such that no output power is transmitted to the secondary output shaft 42 via the input sprocket 46, the chain 50, and the output sprocket 52.

Figure 3:
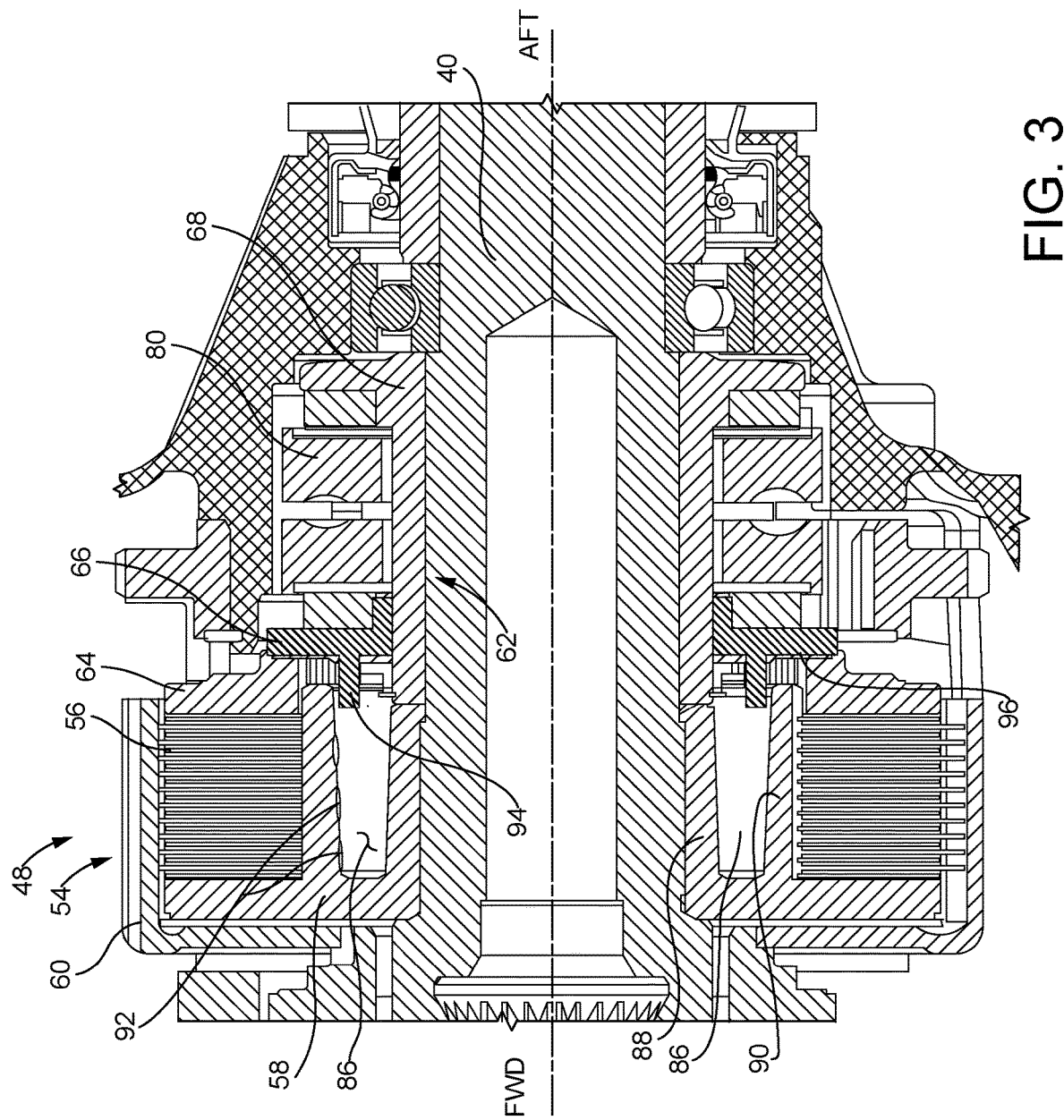
FIG. 3 is an expanded view of detail 3 of FIG. 2, depicting a clutch assembly and a clutch apply assembly having an apply plate with a lubricant guide, constructed in accordance with the present disclosure.

Turning to FIG. 3, the clutch assembly 48 may include a clutch pack 54 having a plurality of interleaved clutch plates 56 that include a friction material in accordance with conventional practice. In addition, the clutch assembly 48 may include a clutch hub 58 that rotatably couples to the primary output shaft 40 by a splined connection, and a clutch drum 60 that rotatably couples to the input sprocket 46 (also see FIG. 2). The clutch plates 56 may include a first group of clutch plates that rotatably couple to the clutch hub 58 via splined connections, and a second group of clutch plates that rotatably couple to the clutch drum 60.

As shown in FIG. 3, the transfer case 16 may further include a clutch apply assembly 62 that engages the clutch assembly 48 to initiate AWD mode. The clutch apply assembly 62 may include a pressure plate 64 and an apply plate 66 mounted on an apply hub 68. The pressure plate 64 and the apply plate 66 may operate together to actuate the clutch assembly 48 by applying pressure and compressing the clutch plates 56 in the axially forward direction. Once actuated, rotational motion may be transmitted from the primary output shaft 40 to the input sprocket 46 through the clutch assembly 48. As used herein, the forward direction refers to the direction opposite to the direction leading to the primary wheels 26, whereas the aft direction refers to the direction leading to the primary wheels 26. To disengage the clutch assembly 48 for 2WD mode, the pressure plate 64 and the apply plate 66 may shift axially aft allowing the clutch plates 56 to separate and rotate independently. When separated, rotational motion is no longer transmitted from the primary output shaft 40 to the input sprocket 46 through the clutch assembly 48.

Figure 4:
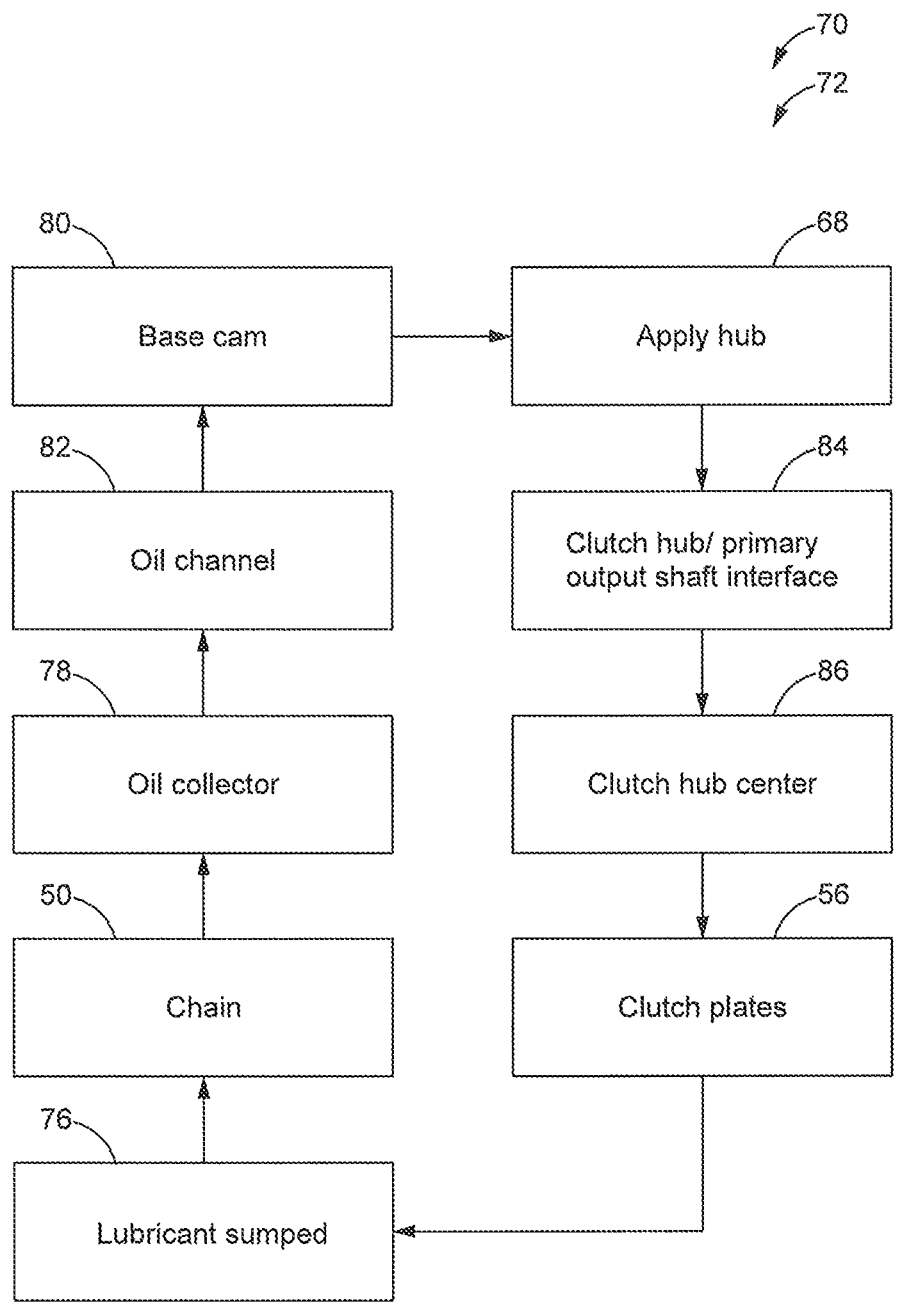
FIG. 4 is a schematic representation of a passive lubricant fluid circuit of the active transfer case, constructed in accordance with the present disclosure.
Figure 5:
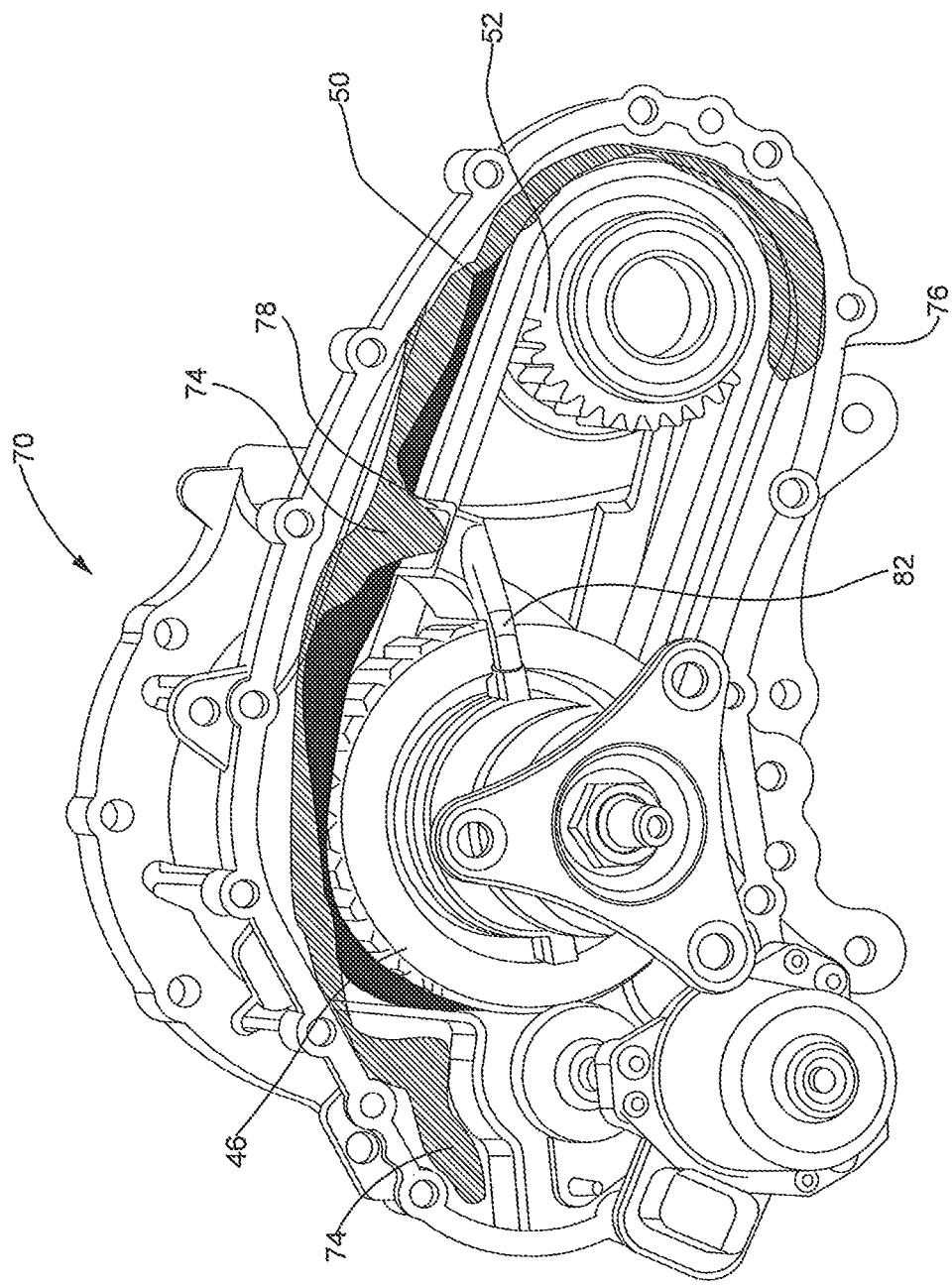
FIG. 5 is a side view of the active transfer case, depicting the flow of the lubricant fluid through the passive lubricant fluid circuit with portions of a chain of the active transfer case removed for clarity, constructed in accordance with the present disclosure.

Referring now to FIGS. 4-5, the transfer case 16 may have a "passive" lubricant fluid system 70 that uses a passive lubricant fluid circuit 72 to deliver a lubricant fluid 74 to the clutch plates 56 when the clutch assembly 48 is engaged. As opposed to an "active" lubricant fluid system which uses a pump (or other positive displacement device) to force the flow of the lubricant fluid to the clutch plates, the passive lubricant fluid system 70 may rely on splash of the lubricant fluid 74 off of rotating components of the transfer case 16 to distribute the lubricant fluid 74 to the clutch plates 56. In particular, the passive lubricant fluid circuit 72 may be initiated when the clutch assembly 48 is engaged and the chain 50 begins to rotate. Rotation of the chain 50 may cause the chain to pick up some of the lubricant fluid 74 from a lubricant sump 76 and carry the lubricant fluid 74 to the top of the transfer case 16. At the top of the transfer case 16, the lubricant fluid 74 may be deposited into an oil collector 78 by splashing off of the chain 50 into the oil collector 78. The lubricant fluid 74 may then flow from the oil collector 78 to a base cam 80 and the apply hub 68 of the clutch apply assembly 62 through an oil channel 82 (also see FIG. 3). From the apply hub 68, the lubricant fluid 74 may flow to an interface 84 between the clutch hub 58 and the primary output shaft 40 (also see FIG. 3). From the interface 84, the lubricant fluid 74 may flow to a clutch hub center 86 of the clutch hub 58 that is defined in a space between an inner ring 88 and an outer ring 90 of the clutch hub 58 (also see FIG. 3). The outer ring 90 of the clutch hub center 86 may have one or more hub apertures 92 that place the clutch hub center 86 in fluid communication with the clutch plates 56, and permit the lubricant fluid 74 to flow to the clutch plates 56 by centrifugal force. After delivery to the clutch plates 56, the lubricant fluid 74 may be cycled back to the lubricant sump 76 as shown in FIG. 4.

Referring back to FIG. 3, to prevent the lubricant fluid 74 from dispersing away from the clutch hub 58 to unintended areas of the transfer case 16, the apply plate 66 may include a lubricant guide 94 that blocks the lubricant fluid 74 from flowing to locations away from the clutch hub center 86 (e.g., between the pressure plate 64 and the apply plate 66). The lubricant guide 94 may be an annular projection on a face 96 of the apply plate 66 that is oriented toward the clutch hub center 86. Specifically, as shown in FIG. 3, the lubricant guide 94 may extend from the face 96 of the apply plate 66 toward the clutch hub center 86. The lubricant guide 94 may be formed integrally with the apply plate 66, or it may be mechanically or chemically attached to the apply plate 66.

Figure 6:
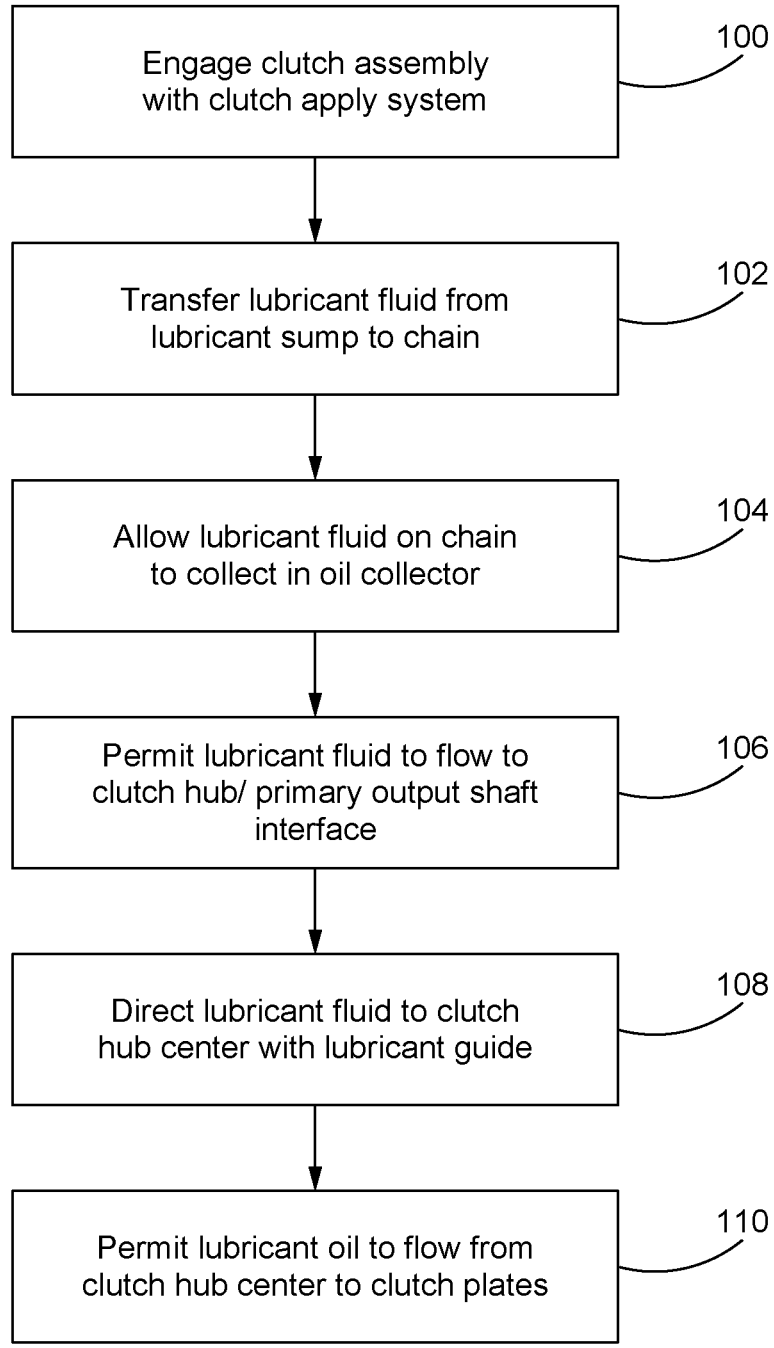
FIG. 6 is a flow chart of an exemplary method for directing the lubricant fluid to a center of a clutch hub of the active transfer case, in accordance with a method of the present disclosure.

Referring now to FIG. 6, an exemplary method of directing the lubricant fluid 74 to the clutch plates 56 when the clutch assembly 48 is engaged is shown. Beginning with a first block 100, the clutch assembly 48 may be engaged using the pressure plate 64 and the apply plate 66 of the clutch apply assembly 62 as explained above. Upon engagement of the clutch assembly 48, rotational motion may be transferred from the primary output shaft 40 to the input sprocket 46, causing the chain 50 to rotate. As a result, the chain 50 may pick up some of the lubricant fluid 74 from the lubricant sump 76 according to a block 102. At least some of the lubricant fluid 74 may then be carried on the chain 50 to the top of the transfer case 16 and may be deposited in the oil collector 78 by splashing off of the chain 50 according to a next block 104 (also see FIG. 5). From the oil collector 78, the lubricant fluid 74 may flow to the interface 84 between the clutch hub 58 and the primary output shaft 40 via the oil channel 82 and the flow path described above in reference to FIG. 4 (block 106). From the clutch hub 58/primary output shaft 40 interface, the lubricant fluid 74 may be routed to the clutch hub center 86 using the lubricant guide 94 on the apply plate 66 (block 108). Once in the clutch hub center 86, the lubricant fluid 74 may be permitted to flow to the clutch plates 56 through the hub aperture(s) 92 on the outer ring 90 (block 110).

Figure 7:
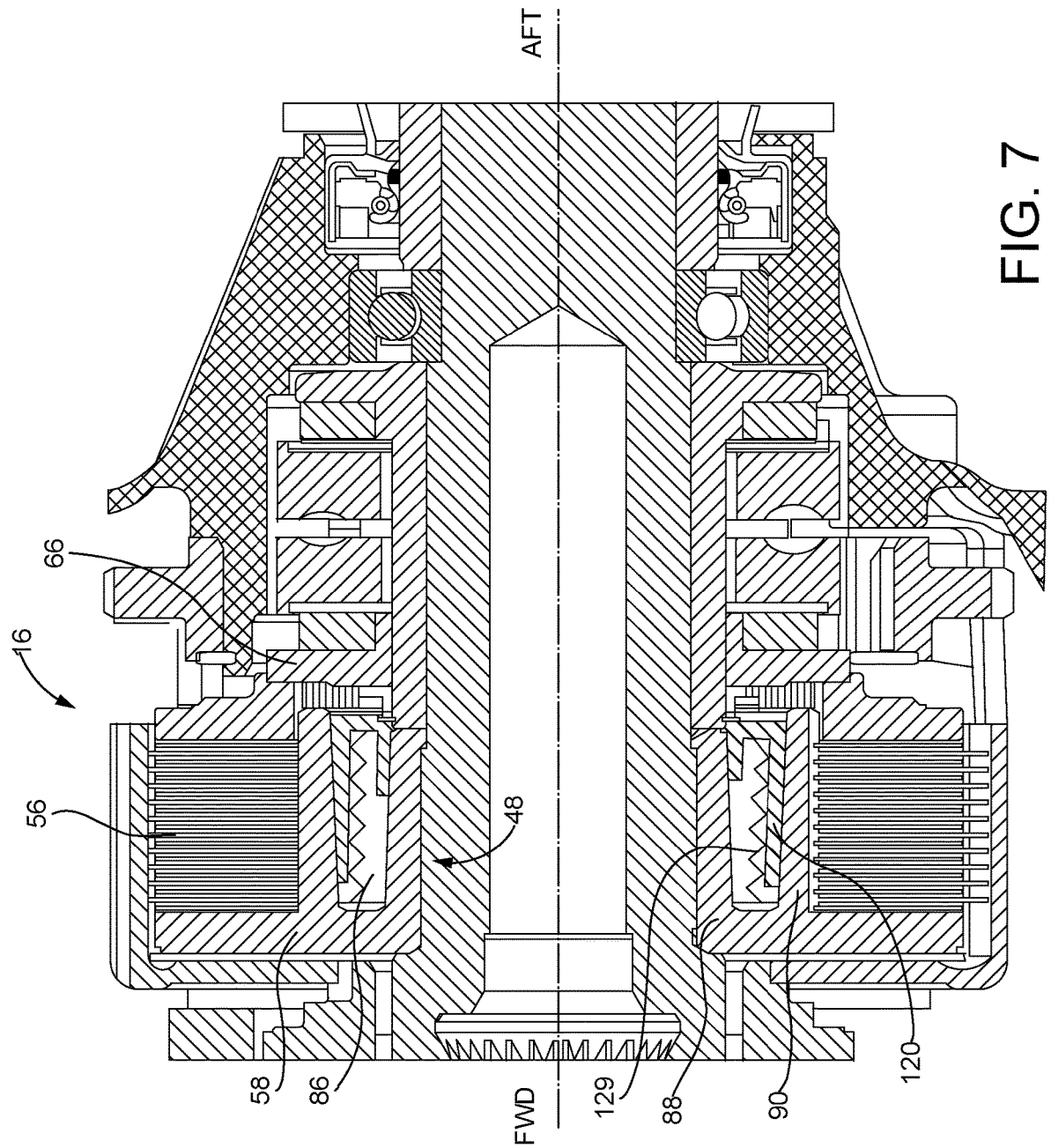
FIG. 7 is a cross-sectional view of the active transfer case similar to FIG. 3 but having a retainer inserted in the clutch hub, constructed in accordance with the present disclosure.
Figure 8:
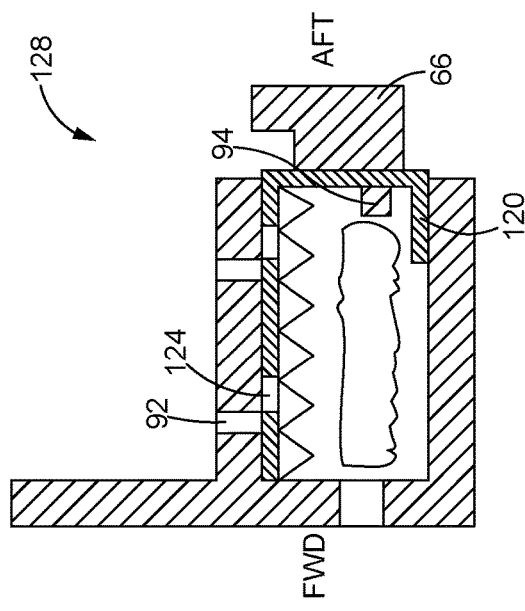
FIG. 8 is a cross-sectional view of a portion of the clutch hub, the retainer, and the apply plate of FIG. 7 shown in isolation with the clutch assembly disengaged, constructed in accordance with the present disclosure.
Figure 9:
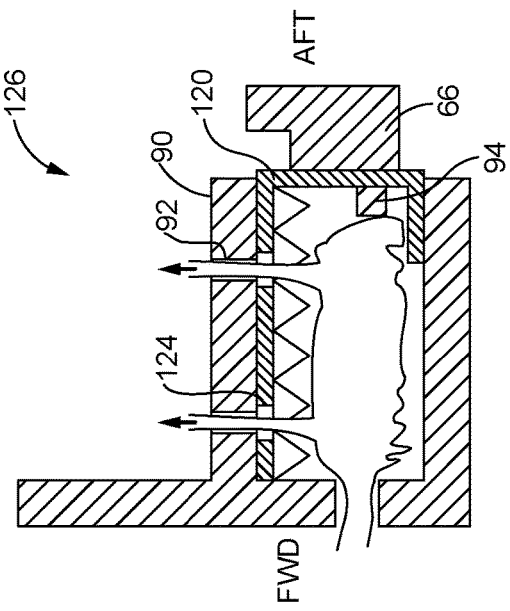
FIG. 9 is a cross-sectional view similar to FIG. 8 but with the clutch assembly engaged, constructed in accordance with the present disclosure.

In another arrangement, the transfer case 16 may include a retainer 120 inserted inside of the clutch hub center 86 between the inner ring 88 and the outer ring 90 as shown in FIGS. 7-9. The retainer 120 may be a cup-shaped annular piece suitably sized to insert in the annular space between the inner ring 88 and the outer ring 90. As shown in FIGS. 8-9, the retainer 120 may be configured to trap a reservoir 122 of the lubricant fluid 74 that is ready for immediate delivery to the clutch plates 56 when the clutch assembly 48 is engaged. Such an arrangement avoids or reduces a delay in delivery of the lubricant fluid 74 to the clutch plates 56 as may occur in prior art systems in which the lubricant fluid must flow through the passive lubricant fluid circuit before reaching the clutch plates.

The retainer 120 may include retainer apertures 124 that may be misaligned with the hub apertures 92 when the clutch assembly 48 is disengaged to obstruct the flow of lubricant fluid 74 to the clutch plates 56 (FIG. 8), or aligned with the hub apertures 92 when the clutch assembly 48 is engaged to permit the flow of the lubricant fluid 74 to the clutch plates 56 (FIG. 9). In particular, the retainer 120 may slide axially in the clutch hub center 86 between a first position 126 in which the retainer apertures 124 are aligned with the hub apertures 92 (FIG. 9), and a second position 128 in which the retainer apertures 124 are misaligned with the hub apertures 92 (FIG. 8). In addition, a spring 129 located in the retainer 120 may be compressed when the retainer 120 is in the first position 126 (see FIG. 9), and extended when the retainer 120 is in the second position 128 (see FIG. 8). As a non-limiting possibility, the spring 129 may be a wave spring as will be understood by those with ordinary skill in the art.

Referring to FIG. 9, as the clutch assembly 48 is engaged, the apply plate 66 may apply pressure to the retainer 120, causing the retainer 120 to slide axially forward in the clutch hub center 86 to the first position 126. As a result, the retainer apertures 124 may come into alignment with the hub apertures 92 to provide fluid communication between the clutch hub center 86 and the clutch plates 56. The reservoir 122 of the lubricant fluid 74 may then be immediately discharged to the clutch plates 56 through the aligned apertures 92 and 124 to avoid possible damage to the clutch plates 56 caused by a delay in delivery through the passive lubricant fluid circuit 72. Meanwhile, more of the lubricant fluid 74 may be directed to the clutch hub center 86 via the passive lubricant fluid circuit 72 for delivery to the clutch plates 56 through the aligned apertures 92 and 124. To ensure that the reservoir 122 of the lubricant fluid 74 is maintained in the clutch hub center 86, the rate of flow of the lubricant fluid 74 into the clutch hub center 86 through the passive lubricant fluid circuit 72 may exceed the rate of flow of the lubricant fluid 74 out of the retainer 120 through the aligned apertures 92 and 124.

Referring to FIG. 8, as the clutch assembly 48 is disengaged and the pressure applied by the apply plate 66 is relieved, the spring 129 may extend to slide the apply plate 66 and the retainer 120 axially aft so that the retainer 120 shifts to the second position 128. The misaligned apertures 92 and 124 may obstruct the flow of the lubricant fluid 74 out of the clutch hub center 86, thereby trapping the reservoir 122 of the lubricant fluid 74 in the clutch hub center 86. As such, the reservoir 122 is available for immediate delivery to the clutch plates 56 upon a subsequent engagement of the clutch assembly 48.

Figure 10:
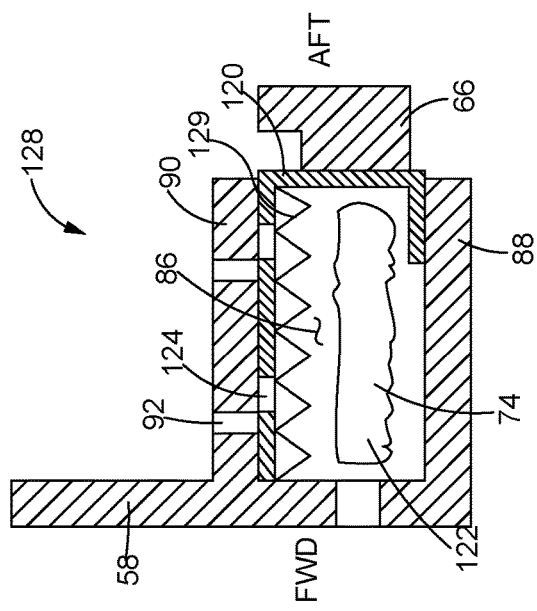
FIG. 10 is a cross-sectional view similar to FIG. 8 but with the apply plate having the lubricant guide, constructed in accordance with the present disclosure.
Figure 11:
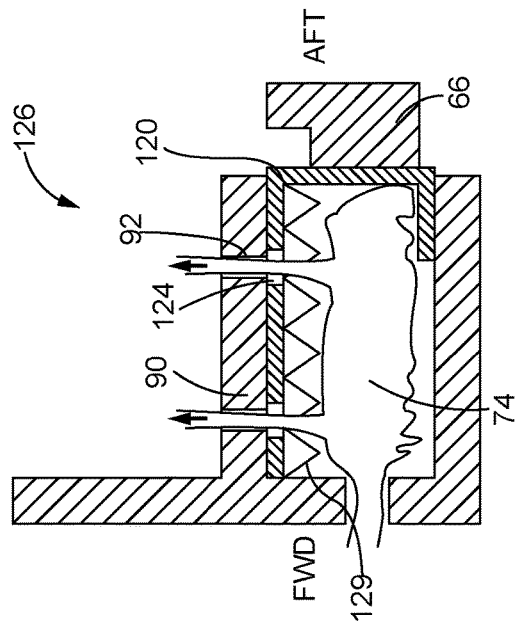
FIG. 11 is a cross-sectional view similar to FIG. 10 but with the clutch assembly engaged, constructed in accordance with the present disclosure.

In an alternative arrangement, the apply plate 66 may include the lubricant guide 94, as shown in FIGS. 10-11. In such an arrangement, the lubricant guide 94 may assist in blocking the flow of the lubricant fluid 74 to areas away from the clutch hub center 86 when the clutch assembly 48 is engaged (see FIG. 11).

Figure 12:
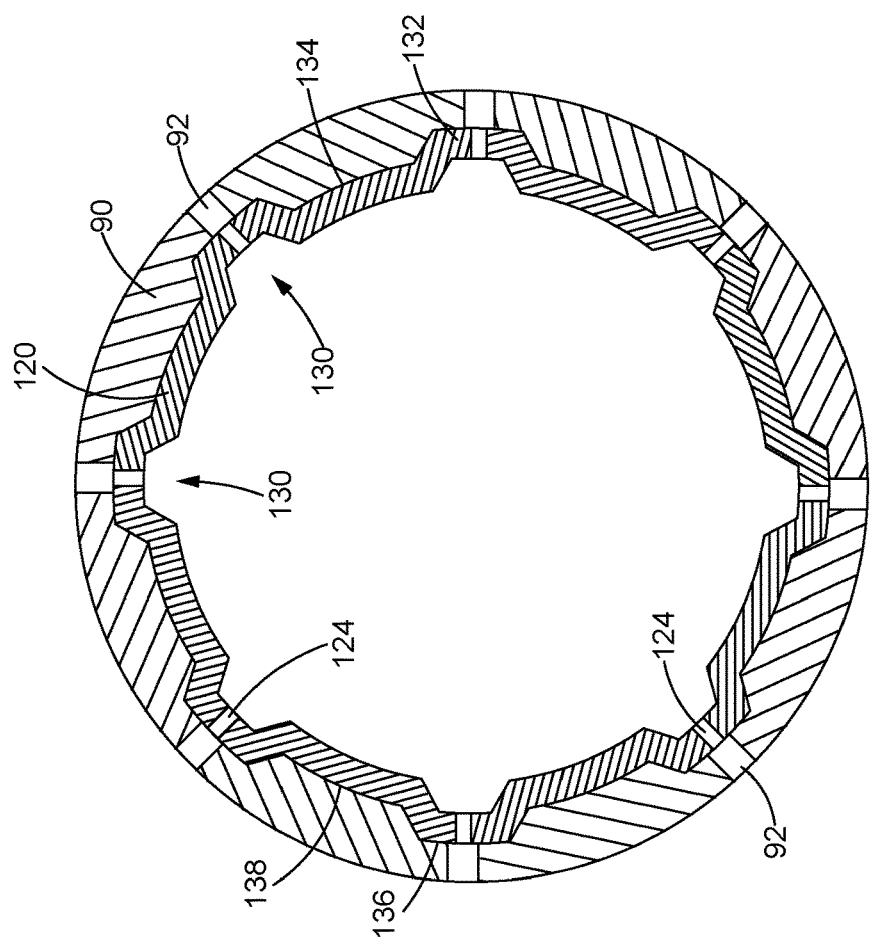
FIG. 12 is a cross-sectional view of the retainer assembled with an outer ring of the clutch hub, constructed in accordance with the present disclosure.

Referring now to FIG. 12, a cross-section of the retainer 120 assembled with the outer ring 90 of the clutch hub 58 is shown. Namely, FIG. 12 shows the configuration of the retainer 120 and the outer ring 90 when the retainer 120 is in the first position 126. The retainer 120 may engage with the outer ring 90 of the clutch hub 58 by splined connections 130 between splined teeth 132 along an outer surface 134 of the retainer 120 and complimentary splined grooves 136 along an inner surface 138 of the outer ring 90. In addition, the retainer apertures 124 may be presented along the splined teeth 132 and the hub apertures 92 may be presented along the splined grooves 136 to ensure that the retainer apertures 124 and the hub apertures 92 are in register with each other. The retainer 120 may slide along the splined connections 130 between the first position 126 and the second position 128, with the splined connections 130 maintaining proper registration between the hub apertures 92 and the retainer apertures 124.

Figure 13:
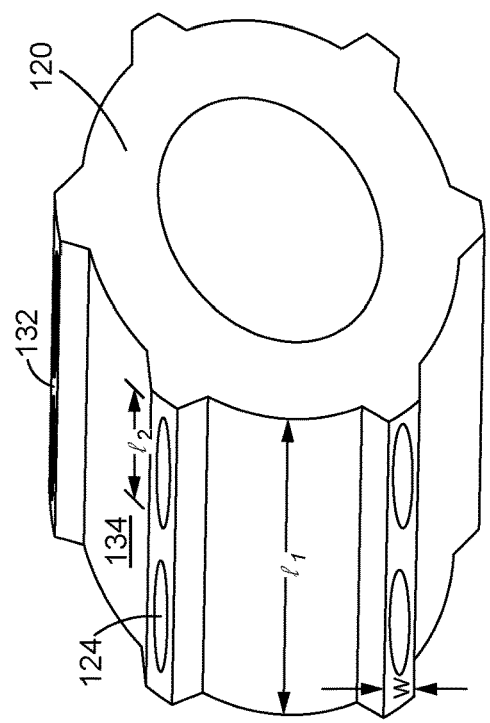
FIG. 13 is a perspective view of the retainer shown in isolation, constructed in accordance with the present disclosure.

Turning to FIG. 13, the retainer 120 is shown in isolation. The splined teeth 132 may project from the outer surface 134 and extend along an axial length (h) of the retainer 120, with the retainer apertures 124 being distributed along the splined teeth 132. The retainer apertures 124 may be elongated slots each having an axial length ($l_2$) that is greater than a width (w) of the aperture 124. Such an arrangement provides an open area permitting lubricant flow along the axial length ($l_1$) of the retainer 120 when the clutch assembly 48 is engaged. It is further noted here that the number, position, distribution, and dimensions of the retainer apertures 124, the splined teeth 132, the splined grooves 136, and the hub apertures 92 may vary considerably depending on the design of the transfer case 16.

INDUSTRIAL APPLICABILITY

In general, the teachings of the present disclosure may find applicability in the automotive industry. More specifically, the present disclosure may find applicability in automotive applications using transfer cases having a passive lubricant fluid system for delivering a lubricant fluid to the clutch plates.

Figure 14:
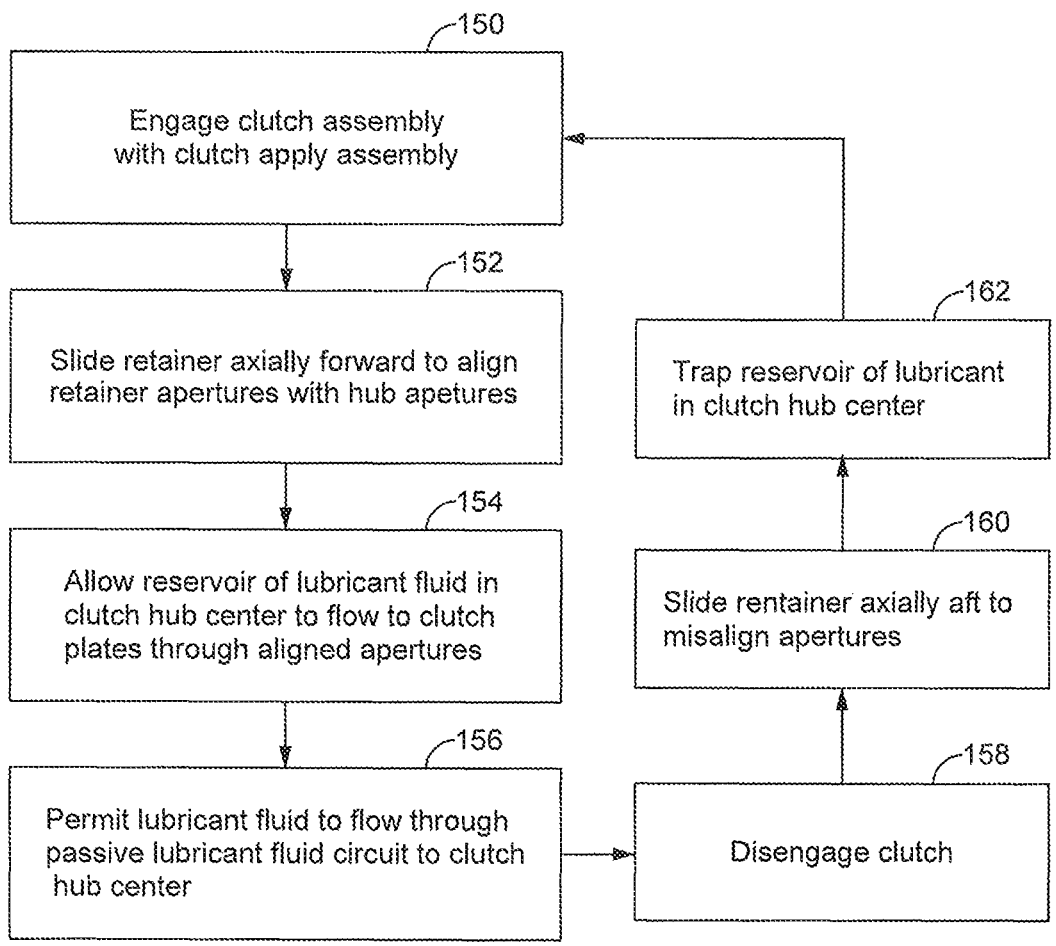
FIG. 14 is a flow chart of an exemplary method of delivering the lubricant fluid to the clutch plates, in accordance with another method of the present disclosure.

FIG. 14 illustrates a series of steps that may be involved in delivering the lubricant fluid 74 to the clutch plates 56 in accordance with the present disclosure. Beginning with a first block 150, the clutch assembly 48 may be engaged using the clutch apply assembly 62. Specifically, the pressure plate 64 and the apply plate 66 may compress the clutch plates 56 to allow transmission of rotational motion from the primary output shaft 40 to the input sprocket 46. The rotational motion may then be transmitted to the secondary output shaft 42 via the interconnecting chain 50 and the output sprocket 52. Furthermore, as the clutch assembly 48 is engaged, the apply plate 66 may slide the retainer 120 axially forward in the clutch hub center 86 to the first position 126, thereby bringing the retainer apertures 124 of the retainer 120 and the hub apertures 92 of the clutch hub 58 into alignment (block 152). The aligned apertures 92 and 124 may permit the flow of the reservoir 122 of the lubricant fluid 74 stored in the clutch hub center 86 to the clutch plates 56 (block 154), thereby providing immediate delivery of the lubricant fluid 74 to the clutch plates 56. While this is occurring, more of the lubricant fluid 74 may flow to the clutch hub center 86 via the passive lubricant fluid circuit 72 according to a block 156, thereby replenishing the supply of the lubricant fluid 74 in the clutch hub center 86 while supplying more of the lubricant fluid 74 to the clutch plates 56 through the aligned apertures 92 and 124. The rate of flow of the lubricant fluid 74 into the clutch hub center 86 through the passive lubricant fluid circuit 72 may exceed the rate of the flow of the lubricant fluid 74 out of the clutch hub center 86 to the clutch plates 56 to maintain a constant supply of the lubricant fluid 74 in the clutch hub center 86. In some arrangements, the block 156 may involve guiding the flow of the lubricant fluid 74 to the clutch hub center 86 using the lubricant guide 94 on the apply plate 66.

According to a block 158, the clutch assembly 48 may be disengaged by relieving the pressure on the clutch plates 56. In addition, the spring 129 in the retainer 120 may extend to slide the retainer 120 axially aft to the second position 128 to bring the retainer apertures 124 and the hub apertures 92 out of alignment (block 160). The misaligned apertures 92 and 124 may obstruct the flow of the lubricant fluid 74 to the clutch plates 56. Consequently, the reservoir 122 of the lubricant fluid 74 may be trapped in the clutch hub center 86 (block 162) for immediate delivery to the clutch plates 56 upon the next engagement of the clutch assembly 48.

The active transfer case of the present disclosure includes a retainer that stores a reservoir of lubricant fluid in the clutch hub center for immediate delivery to the clutch plates when the clutch assembly is engaged. This is an improvement over transfer cases of the prior art having passive lubricant fluid systems which may have a delay between clutch engagement and delivery of the lubricant fluid to the clutch plates due to the time required for the lubricant fluid to flow through the lubricant fluid circuit. Consequently, damage to the clutch assembly may be advantageously avoided with the retainer of the present disclosure. The retainer of the present disclosure includes apertures that align with apertures of the clutch hub center when the clutch assembly is engaged to permit lubricant fluid to flow from the clutch hub center to the clutch plates. When the clutch assembly is disengaged, the retainer slides axially within the clutch hub center to misalign the apertures, thereby trapping a reservoir of the lubricant fluid in the clutch hub center that is available for immediate delivery to the clutch plates upon the next clutch assembly actuation. The active transfer case disclosed herein may further include a lubricant guide on the apply plate that acts as a routing feature to guide the flow of the lubricant fluid to the clutch hub center when the clutch assembly is engaged. Thus, dispersion of the lubricant fluid to unintended areas of the transfer case, as well as resulting damage to the clutch plates, may be advantageously avoided.

What is claimed is:

1. An active transfer case, for a motor vehicle, comprising:
   a primary output shaft and a secondary output shaft;
   an input sprocket and an output sprocket, the secondary output shaft being rotatably coupled to the output sprocket;
   a chain rotatably coupling the input sprocket to the output sprocket;
   a clutch assembly configured to rotatably couple the primary output shaft to the input sprocket when engaged, the clutch assembly including a clutch pack having a plurality of clutch plates, the clutch assembly further including a clutch hub having a clutch hub center defined between an inner ring and an outer ring, the outer ring of the clutch hub having at least one hub aperture placing the clutch hub center in fluid communication with the clutch plates;
   a passive lubricant fluid circuit configured to circulate a lubricant fluid through the clutch hub center and the clutch plates when the clutch assembly is engaged; and
   a retainer slidingly inserted in the clutch hub center between the inner ring and the outer ring, the retainer including at least one retainer aperture that aligns with the hub aperture of the clutch hub when the clutch assembly is engaged to permit a flow of the lubricant fluid from the clutch hub center to the clutch plates.

2. The active transfer case of claim 1, wherein the retainer is configured to slide axially between a first position in which the retainer aperture is aligned with the hub aperture to permit the flow of the lubricant fluid from the clutch hub center to the clutch plates, and a second position in which the retainer aperture is misaligned with the hub aperture to obstruct the flow of the lubricant fluid from the clutch hub center to the clutch plates, wherein the retainer is in the first position when the clutch assembly is engaged, and wherein the retainer is in the second position when the clutch assembly is disengaged.

3. An active transfer case for a motor vehicle, comprising:
   a primary output shaft and a secondary output shaft;
   an input sprocket and an output sprocket, the secondary output shaft being rotatably coupled to the output sprocket;
   a chain rotatably coupling the input sprocket to the output sprocket;
   a clutch assembly configured to rotatably couple the primary output shaft to the input sprocket when engaged, the clutch assembly including a clutch pack having a plurality of clutch plates, the clutch assembly further including a clutch hub having a clutch hub center defined between an inner ring and an outer ring, the outer ring of the clutch hub having at least one hub aperture placing the clutch hub center in fluid communication with the clutch plates;
   a passive lubricant fluid circuit configured to circulate a lubricant fluid through the clutch hub center and the clutch plates when the clutch assembly is engaged; and
   a retainer slidingly inserted in the clutch hub center between the inner ring and the outer ring, the retainer including at least one retainer aperture that aligns with the hub aperture of the clutch hub when the clutch assembly is engaged to permit a flow of the lubricant fluid from the clutch hub center to the clutch plates, wherein the retainer is configured to trap a reservoir of the lubricant fluid in the clutch hub center when the clutch assembly is disengaged.

4. The active transfer case of claim 3, wherein a rate of flow of the lubricant fluid into the clutch hub center exceeds a rate of flow of the lubricant fluid out of the clutch hub center through the aligned apertures to the clutch plates when the clutch assembly is engaged.

5. The active transfer case of claim 4, wherein the retainer includes an outer surface having splined teeth that engage with complementary splined grooves on an inner surface of the outer ring of the clutch hub.

6. The active transfer case of claim 5, further including a spring located inside of the retainer configured to shift the retainer to the second position when the clutch assembly is disengaged.

7. The active transfer case of claim 6, wherein the spring is a wave spring.

8. The active transfer case of claim 6, wherein the retainer aperture includes an axial length and a width, and wherein the axial length is greater than the width.

9. The active transfer case of claim 6, wherein the outer ring of the clutch hub center includes a plurality of the hub apertures, and wherein the retainer includes a plurality of the retainer apertures.

10. The active transfer case of claim 9, wherein the retainer apertures are each aligned with a respective one of the hub apertures when the clutch assembly is engaged to permit the flow of the lubricant fluid from the clutch hub center to the clutch plates, and, wherein the retainer apertures and the hub apertures are misaligned when the clutch assembly is disengaged to obstruct the flow of the lubricant fluid from the clutch hub center to the clutch plates.

11. The active transfer case of claim 9, further comprising an apply plate and a pressure plate configured to engage the clutch assembly by compressing the clutch plates, the apply plate being further configured to slide the retainer axially to the first position as the clutch assembly is engaged.

12. A method for delivering a lubricant fluid to clutch plates of an active transfer case, the active transfer case including a chain rotatably coupling an input sprocket to an output sprocket, a primary output shaft, a secondary output shaft rotatably coupled to the output sprocket, and a clutch assembly configured to rotatably couple the input sprocket to the primary output shaft when engaged, the clutch assembly including the clutch plates, a clutch hub having a clutch hub center defined between an inner ring and an outer ring, and a retainer inserted in the clutch hub center between the inner ring and the outer ring, the method comprising:

engaging the clutch assembly with an apply plate and a pressure plate;

sliding the retainer axially in the clutch hub center to a first position in which at least one retainer aperture of the retainer is aligned with at least one hub aperture of the outer ring, the aligned apertures providing fluid communication between the clutch hub center and the clutch plates;

allowing a reservoir of a lubricant fluid trapped in the clutch hub center to flow through the aligned apertures to the clutch plates; and permitting the lubricant fluid to flow into the clutch hub center through a passive lubricant fluid circuit, a rate of flow of the lubricant fluid into the clutch hub center exceeding a rate of flow of the lubricant fluid out the clutch hub center through the aligned apertures.

13. The method of claim 12, further comprising:

disengaging the clutch assembly; and sliding the retainer axially in the clutch hub center to a second position in which the retainer aperture and the hub aperture are misaligned, the misaligned apertures obstructing the flow of the lubricant fluid from the clutch hub center to the clutch plates.

14. The method of claim 13, further comprising trapping at least a portion of the lubricant fluid in the clutch hub center using the misaligned apertures after sliding the retainer axially in the clutch hub center to the second position.

15. The method of claim 14, wherein sliding the retainer axially in the clutch hub center to the first position comprises sliding the retainer axially in the clutch hub center with the apply plate.

* * * * *